(12) United States Patent
Hooijmans et al.

(10) Patent No.: US 8,074,250 B2
(45) Date of Patent: Dec. 6, 2011

(54) HIGH FREQUENCY TUNER

(75) Inventors: Pieter Werner Hooijmans, Eindhoven (NL); Cicero Silveira Vaucher, Eindhoven (NL)

(73) Assignee: NXP B.V., Eindhoven (NL)

( * ) Notice: Subject to any disclaimer, the term of this patent is extended or adjusted under 35 U.S.C. 154(b) by 1120 days.

(21) Appl. No.: 10/508,457

(22) PCT Filed: Feb. 26, 2003

(86) PCT No.: PCT/IB03/00750
§ 371 (c)(1),
(2), (4) Date: Sep. 21, 2004

(87) PCT Pub. No.: WO03/081916
PCT Pub. Date: Oct. 2, 2003

(65) Prior Publication Data
US 2005/0233692 A1 Oct. 20, 2005

(30) Foreign Application Priority Data
Mar. 26, 2002 (EP) ..................... 02076188

(51) Int. Cl.
*H04N 7/16* (2011.01)
(52) U.S. Cl. .......... 725/131; 725/139; 725/151
(58) Field of Classification Search .............. 725/131, 725/139, 151
See application file for complete search history.

(56) References Cited

U.S. PATENT DOCUMENTS

| | | | | |
|---|---|---|---|---|
| 3,668,307 A * | 6/1972 | Face et al. | | 725/119 |
| 5,432,501 A * | 7/1995 | Yoon | | 340/650 |
| 5,673,323 A * | 9/1997 | Schotz et al. | | 381/2 |
| 5,727,060 A * | 3/1998 | Young | | 348/734 |
| 5,812,930 A * | 9/1998 | Zavrel | | 725/62 |
| 5,982,363 A | 11/1999 | Naiff | | |
| 6,031,878 A | 2/2000 | Tomasz et al. | | 375/316 |
| 6,108,718 A * | 8/2000 | Fujimori et al. | | 710/9 |
| 6,721,548 B1 | 4/2004 | Mohindra et al. | | |
| 6,880,036 B2 * | 4/2005 | Bertin et al. | | 710/313 |
| 7,003,792 B1 * | 2/2006 | Yuen | | 725/46 |
| 7,150,032 B1 * | 12/2006 | Sadanaka et al. | | 725/80 |
| 2003/0002598 A1 | 1/2003 | Inose et al. | | |
| 2003/0066086 A1 * | 4/2003 | Tanaka et al. | | 725/105 |
| 2003/0088870 A1 * | 5/2003 | Wang | | 725/44 |
| 2003/0212999 A1 * | 11/2003 | Cai | | 725/119 |

FOREIGN PATENT DOCUMENTS

| | | |
|---|---|---|
| AU | 737 180 | 8/2001 |
| CN | 1341302 A | 3/2002 |
| JP | 11-041533 A | 2/1999 |
| JP | 11 161165 | 9/1999 |
| JP | 2001-094895 A | 4/2001 |
| JP | 2001-119361 A | 4/2001 |
| JP | 2001-160930 A | 6/2001 |
| JP | 2001-168941 A | 6/2001 |
| JP | 2001-285737 A | 10/2001 |
| JP | 2001-320291 A | 11/2001 |
| JP | 2001-339665 A | 12/2001 |
| JP | 2002-044605 A | 2/2002 |
| WO | 03/081916 A1 | 10/2003 |

* cited by examiner

*Primary Examiner* — Christopher Kelley
*Assistant Examiner* — Franklin Andramuno

(57) ABSTRACT

A tuner for receiving a satellite broadcast signal via an antenna means, said tuner being coupled to a control unit. The tuner is characterized in that it comprises a standard bilateral digital interface for transmitting a base-band signal obtained from the received signal received via the antenna means and for receiving control signals transmitted by the control unit, said signals being transmitted/received via a first bilateral bus.

18 Claims, 2 Drawing Sheets

HIGH FREQUENCY TUNER

Figure 1:
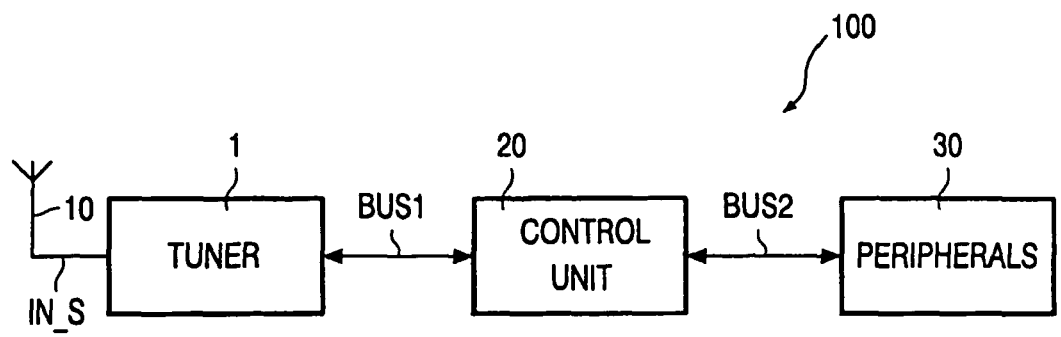

The invention relates to a tuner according to the preamble of claim 1.

Receiving systems are wide spread nowadays because of the proliferation of cable TV, Internet and other high frequency devices. They operate with relatively high frequency signals e.g. in the GHz range and they incorporate as an essential part a receiver.

A common used solution for implementing a high frequency system is described in U.S. Pat. No. 6,031,878. In this patent a direct-conversion tuner incorporated in a set-top-box is presented. The receiving system uses a double frequency conversion i.e. the input signal frequency range is first converted in a first intermediate frequency, said first intermediate frequency being converted in a second intermediate frequency. In this type of system, a high frequency input signal is first converted to a first intermediate frequency situated in a frequency range e.g. [950 . . . 2150] MHz in a Low Noise Block (LNB) situated in a dish antenna. The first intermediate frequency is sent via a coaxial cable to a set-top box. The set-top-box comprises a converter for converting the first intermediate frequency signal into a base-band signal using a quadrature local oscillator whose oscillation frequency equals the frequency of the first intermediate signal. A drawback of this solution is the use of a coaxial cable for relatively high frequency first intermediate frequency signals. The length of this cable influences the quality of the signal received by the set-top-box i.e. the signal is attenuated, phase-shifted and distorted depending on it's frequency and on the length of the coaxial cable. It is further remarked that a feedback from the set-top-box to the LNB is necessary in order to control some parameters of the LNB e.g. it's gain in order to compensate losses determined by the length of the coaxial cable. In many applications this is achieved using a low frequency signal e.g. according to the DiSEqC standard. The generation of a compatible DiSEqC signal in the set-top-box increase it's complexity and, implicitly, it's cost. It is further observed that if more than one broadcast is received a plurality of coaxial cables is necessary increasing the cost and reducing the reliability of the whole system.

It is therefore an object of the present invention to provide a receiving system having a relatively low cost and an increased reliability.

In accordance with the invention this is achieved in a device as described in the introductory paragraph which is characterized in that the tuner comprises a standard bilateral digital interface for transmitting a base-band signal obtained from the received signal via the antenna means and for receiving control signals transmitted by the control unit, said signals being transmitted/received via a first bilateral bus. In a digital broadcast the base-band signals have binary values and a relatively small bandwidth. Using digital signals having a low bandwidth has the advantage that the influence of the length of the first bilateral bus is reduced, the reliability of the communication between the tuner and the control unit being improved.

In an embodiment of the invention the signals circulating through the first bilateral bus are compatible to either IEEE 1394 or USB standards. Using standard buses for wired or wireless standard signals facilitates the communication between systems. Furthermore the above-mentioned signals allows receiving digital broadcast programs as digital television. In the same time the control unit could be either a Personal Computer (PC) or a set-top-box, the tuner becoming a peripheral. The control unit could be further coupled via a second standard bus, said bus coupling different compatible peripherals as printers, keyboards, mice, mobile storage, MP3 players etc. It is to be observed that the second bus could be adapted to transmit and receive signals compatible to either wired or wireless standards.

In another embodiment in order to obtain a low bandwidth for the signal transmitted through the first bus the tuner comprises a zero IF or a direct conversion receiver, it's output signal being a base-band signal. When IEEE 1394 is considered the maximum bandwidth is about 400 MHz and when USB2 is considered the necessary bandwidth is 480 MHz. It is observed that the maximum necessary frequency for the base band signals is almost half the lowest first intermediary frequency used in known receiving systems. This reduces the influence of the coaxial cable, in the case of wired coupling the tuner and the control unit or eliminates the coaxial cable and the imperfections associated with it's use when wireless coupling is considered.

It is further observed that having a zero IF tuner, the second signal conversion from the first IF to the base band is no longer necessary. Hence the cost of the receiver is reduced.

In another embodiment of the invention the tuner comprises a standard digital interface adapted to transform a signal obtained after a channel decoding operation into a signal compatible to the first bilateral bus. The channel decoder comprises a pair of input terminals for receiving a first signal generated by a first analog to digital converter and a second signal generated by a second analog to digital converter. Said analog to digital converters perform a conversion of zero IF quadrature signals into digital signals to be decoded by the channel decoder.

A mixer generates the quadrature signals that are inputted to the analog to digital converters. The mixer combines a quadrature periodical signal generated by a local oscillator with a signal having a frequency substantially equal to the input signal, the periodical signal having a frequency substantially equal to the frequency of the input signal. The tuner further comprises a first controllable buffer and a second controllable buffer for selecting between an input signal being horizontally polarized and an input signal being vertically polarized, respectively. The first buffer and the second buffer are controlled by a binary signal. The tuner comprises a band-pass filter coupled to the first and the second buffers for selecting an input signal situated in a frequency range.

In an embodiment the antenna means comprises an energy converter for supplying the tuner. The energy converter could be for instance a solar cell panel, the solar cells included in the solar panel generating the necessary energy for supplying the tuner. In another embodiment of the invention the control unit included in the receiving system comprises a standard interface coupled to the first bus for receiving the signal transmitted by the tuner. The control unit further comprises a source decoder for decoding the signal received via the first bus and transmitting decoded signals to the peripherals via the second bus. The control unit may for example comprise a MPEG decoder for decoding multimedia signals encoded in such standard.

Figure 2A:
Figure 2B:
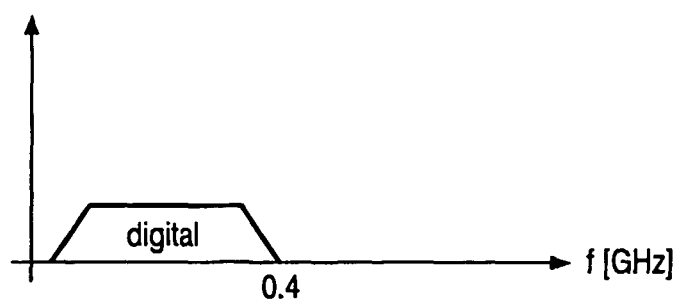
Figure 3:
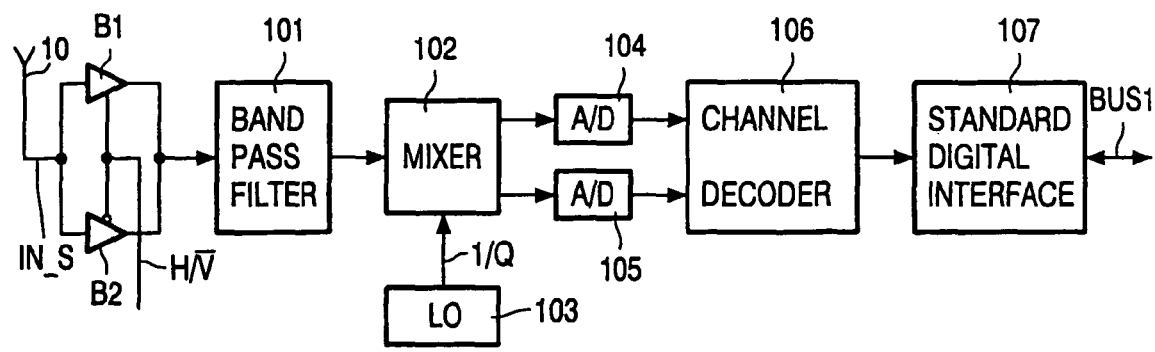
Figure 4:
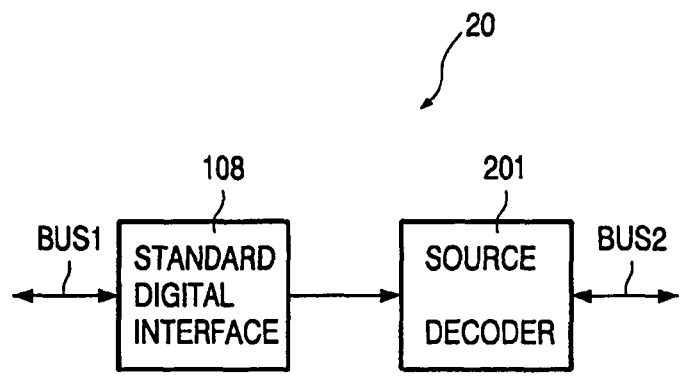

The above and other features and advantages of the invention will be apparent from the following description of exemplary embodiments of the invention with reference to the accompanying drawings, in which:

FIG. 1 depicts a block diagram of a receiving system, according to the invention, FIG. 2a depicts the spectrum of a signal transmitted by the known tuner, FIG. 2b depicts the spectrum of a signal transmitted by the tuner according to an embodiment of the invention, FIG. 3 depicts a more detailed structure of the tuner, according to the invention, FIG. 4 depicts a more detailed structure of a control unit, according to the invention.

FIG. 1 depicts a block diagram of a receiving system, according to the invention. The receiving system 100 comprising a tuner 1 for receiving a satellite broadcast signal IN_S via an antenna means 10, said tuner 1 being coupled to a control unit 20 situated at a relatively big distance from the tuner 1. The receiving system 100 is characterized in that the control unit 20 is coupled to the tuner 1 via a first bilateral bus BUS1, the first bilateral bus BUS1 being adapted to signals having a relatively low bandwidth.

The first bus BUS1 could be adapted to receive and transmit signals compatible to e.g. IEEE 1394 or USB standards. Use of the buses compatible to standard signals for wired or wireless systems facilitates the communication between the blocks of the receiving systems. The control unit 20 could be either a Personal Computer (PC) or a set-top-box, the tuner 1 becoming a peripheral. The control unit 20 is further coupled via a second standard bus BUS2, the second bus BUS2 coupling the control unit 20 to different bus compatible products as printers, keyboards, mice, mobile storage, MP3 players etc. It is to be observed that the second bus BUS2 could be adapted either to wired or wireless signals said signals being compliant to either IEEE 1394 or USB standards.

The tuner 1 is a zero IF receiver for obtaining a low bandwidth for the signal transmitted through the first bus BUS1, the output of the tuner being a base-band one. When IEEE 1394 standard is considered the maximum bandwidth is 400 MHz see FIG. 2b. Alternatively a bus according to the USB2 standard may be used. In this case the necessary bandwidth is 480 MHz. It is observed that the maximum necessary frequency range when standard interface buses are used is approximately half the lowest first intermediary frequency used in the prior art. In the prior art a high frequency input signal is first converted to a first intermediate frequency situated in a frequency range e.g. [950 . . . 2150] MHz in a Low Noise Block (LNB) situated in a dish antenna. Therein the first intermediate frequency is sent via a coaxial cable to a set-top box. A feedback signal is sent by the set-top-box for controlling the LNB e.g. using a signal defined in DiSEqC standard, as shown in FIG. 2a. Using relatively low frequency signals results that the influence of a bus coupling the tuner 1 and the control unit 20 is reduced i.e. the signal is less attenuated, less distorted and less phase-shifted. It results that in the control unit 20 are inputted only digital signals. This reduces the problems related to the interference occurring between radio frequency modulated signals and digital signals as could appear in the prior art. This simplifies the design of the control unit 20 and reduces it's cost.

The tuner 1 is a zero IF receiver converting the input signal IN_S in a base-band signal. Adopting such a solution a first conversion of the input signal into a first IF signal is eliminated reducing the cost of the receiver.

FIG. 3 depicts a more detailed structure of the tuner 1, according to the invention. The tuner 1 comprises a first controllable buffer B1 coupled to a second controllable buffer B2, the two buffers being coupled to an antenna means 10 for receiving the input signal IN_S. The input signal IN_S could be either horizontally polarized or vertically polarized. A horizontally polarized signal is selected and inputted to the first controllable buffer B1 and a vertically polarized signal is selected and inputted to the second controllable buffer B2. A control signal H/V selects either the first controllable buffer B1 or the second controllable buffer B2. The signal outputted either by the first buffer B1 or the second buffer B2 is further inputted to a band pass filter 101, said band bass filter selecting and amplifying only the signals having a frequency situated in a frequency range e.g. 10.7-12.75 GHz or Ku-band. The signal that is outputted by the band pass filter 101 is inputted to a mixer 102 the mixer 102 combining said signal with a periodical signal I/Q generated by a quadrature local oscillator 103. The frequency of the local oscillator 103 is substantially equal to the frequency of the input signal IN_S selected by the band pass filter 101, the signal of the local oscillator 103 having a first component I and a second component Q that are mutually in quadrature, i.e. they are phase-shifted by 90 degrees to each other. The mixer 102 generates a first low-IF signal that is inputted to a first analog to digital converter (A/D) 104 and a second low-IF signal that is inputted to a second analog to digital converter 105. The first low-IF signal and the second low-IF signal are obtained combining the first component I and the second component Q of the quadrature signal generated by the local oscillator 103 with the signal outputted by the band pass filter 101, respectively. The first A/D 104 and the second A/D 105 generate digital signals that are inputted to a channel decoder 106 coupled to said A/D converters. The channel decoder 106 demodulates the low-IF signals and performs error correction decoding on the low-IF input signals. The signal that is outputted by the channel decoder 106 is inputted to a standard digital interface 107. Said interface transforms the inputted signal in a signal compatible with the specifications of the first bus BUS1 e.g. IEEE 1394, USB. The signal that is outputted by the standard digital interface 107 is a stream of bits having a bandwidth of maximally half the bandwidth of the corresponding signal in known receiving system when the above mentioned standards are considered. The antenna means 10 comprises a dish antenna or an antenna array for receiving the input signal IN_S. In an embodiment of the invention the antenna means comprises an energy generator for supplying the tuner. The energy generator is basically a converter from one form of energy e.g. solar energy, wind energy, microwave energy to electrical energy. This solution further simplifies the construction of the receiving system because it is not necessary to provide a separate supply for the tuner.

FIG. 4 depicts a more detailed structure of the control unit 20, according to the invention. The control unit 20 comprises a standard digital interface 107 coupled to a source decoder 201. A serial stream of bits is inputted to the standard digital interface 107 via the bus BUS1 said interface 107 transforming the serial stream of bits into a parallel stream of bits. The parallel stream of bits is inputted to a source decoder 201 for decoding the parallel stream of bits and adapting the decoded signal to the second bus BUS2. For instance the stream of bits could be a MPEG signal and hence the source decoder performs a MPEG signal decoding. The second bus BUS2 is coupled to peripherals as e.g. DVD reader/writer, CD-ROM reader/writer, digital TV-set, video recorder, mouse, keyboard.

Within the features presented in the present invention the tuner 1 is a peripheral of the control unit 20. The control unit 20 could be either a personal computer or a simplified set-top-box, the simplified set-top-box being cheaper than the set-top-boxes coupled to a tuner as is presented in the prior art. Furthermore a simplified set-top-box is easier to be manufactured.

It is remarked that the first bus BUS1 and the second bus BUS2 could be adapted to circulate signals compliant to wireless communication standards. This feature reduces more the price of the receiving system because connection cables between any peripheral and the control unit 20 are no more necessary.

It is further remarked that the scope of protection of the invention is not restricted to the embodiments described herein. Neither is the scope of protection of the invention restricted by the reference numerals in the claims. The word 'comprising' does not exclude other parts than those mentioned in the claims. The word 'a(n)' preceding an element does not exclude a plurality of those elements. Means forming part of the invention may both be implemented in the form of dedicated hardware or in the form of a programmed purpose processor. The invention resides in each new feature or combination of features. Throughout the patent description the word "bus" refers to the propagation medium for a signal and consequently the bus properties refers to it's physical properties.

The invention claimed is:

1. A tuner for receiving a satellite broadcast signal via an antenna means, said tuner being coupled to a control unit, the tuner comprising:
   a standard bilateral digital interface for transmitting to the control unit a base-band signal obtained from the signal received via the antenna means and for receiving from the control unit control signals transmitted by the control unit, and
   a first bilateral digital bus coupled between the standard bilateral digital interface and the control unit to communicate the signals between the bilateral digital interface and the control unit, wherein the tuner is remotely located from the control unit,
   wherein the tuner further comprises a zero IF receiver.

2. A tuner as claimed in claim 1 wherein the signals through the first bilateral bus are compatible to either IEEE 1394 or USB standards.

3. A tuner as claimed in claim 1 wherein the first bilateral bus is adapted to transfer signals compatible to a wireless communications standard.

4. A tuner as claimed in claim 1 comprising a channel decoder for performing a channel decoding operation, the standard digital interface being adapted to transform a signal obtained after the channel decoding operation into a signal compatible to the first bilateral bus.

5. A tuner as claimed in claim 4 wherein the channel decoder comprises a pair of input terminals for receiving a first signal generated by a first analog to digital converter and a second signal generated by a second analog to digital converter said analog to digital converters performing a conversion of zero IF quadrature signals into digital signals to be decoded by the channel decoder.

6. A tuner as claimed in claim 5 wherein the quadrature signals inputted to the analog to digital converters are generated by a mixer, said mixer combining an input signal having a frequency substantially equal to the input signal with a quadrature periodical signal generated by a local oscillator, the periodical signal having a frequency substantially equal to the frequency of the input signal.

7. A tuner as claimed in claim 6 comprising a first controllable buffer and a second controllable buffer for selecting between an input signal being horizontally polarized and an input signal being vertically polarized, respectively.

8. A tuner as claimed in claim 7 wherein the first buffer and the second buffer are controlled by a binary signal.

9. A tuner as claimed in claim 8 comprising a band-pass filter coupled to the first buffer and to the second buffer for selecting an input signal situated in a frequency range.

10. A tuner as claimed in claim 1 wherein the antenna means comprises an energy converter for supplying the tuner.

11. A tuner as claimed in claim 1 the tuner being integrated in a single chip.

12. A receiving system comprising a tuner as claimed in claim 1, said receiving system comprising the control unit, the control unit being coupled to the tuner via the first bus, the control unit comprising a second standard interface coupled to the first bus for receiving the signal transmitted by the tuner, said control unit further comprising a source decoder for decoding the signal received via the first bus and transmitting decoded signals to the peripherals via the second bus.

13. A receiving system as claim in claim 12 wherein the source decoder is a MPEG decoder.

14. A receiving system as claimed in claim 12 wherein the control unit is a set-top-box.

15. A receiving system as claimed in claim 12 wherein the control unit is a personal computer.

16. A receiving system as claimed in claim 12 wherein the control unit is further coupled to a plurality of peripherals via a second bilateral bus.

17. A receiving system as claimed in claim 13 wherein the second bilateral bus is adapted to transmit and receive signals compatible to either IEEE 1394 or USB standards.

18. A receiving system as claimed in claim 12 wherein the second bilateral bus is adapted to transfer signals compatible to a wireless communications standard.

* * * * *